United States Patent [19]

Asami et al.

[11] Patent Number: 4,671,533
[45] Date of Patent: Jun. 9, 1987

[54] SUSPENSION CONTROLLER

[75] Inventors: Ken Asami, Nagoya; Kaoru Ohashi, Okazaki; Toshio Onuma, Susono; Shuuichi Buma, Toyota, all of Japan

[73] Assignee: Toyota Jidosha Kabushiki Kaisha, Toyota, Japan

[21] Appl. No.: 815,166

[22] Filed: Dec. 31, 1985

[30] Foreign Application Priority Data

Jan. 16, 1985 [JP] Japan .................................... 60-7247

[51] Int. Cl.$^4$ ............................................. B60G 17/00
[52] U.S. Cl. .................................... 280/707; 280/611; 280/DIG. 1; 180/41
[58] Field of Search ................ 280/707, DIG. 1, 6 M, 280/6.1, 6 R; 180/41

[56] References Cited

U.S. PATENT DOCUMENTS 4,185,845 1/1980 Misch et al. .................. 280/DIG. 1

FOREIGN PATENT DOCUMENTS 58-30542  2/1983  Japan .
59-26638  2/1984  Japan .
59-23712  2/1984  Japan .
59-129613 7/1984  Japan .
59-132408 7/1984  Japan .

Primary Examiner—John J. Love
Assistant Examiner—Kenneth R. Rice
Attorney, Agent, or Firm—Oblon, Fisher, Spivak, McClelland & Maier

[57] ABSTRACT

A suspension controller for controlling the suspension characteristic of a vehicle having a suspension which supports a vehicle body on plural wheels, wherein the distance between the vehicle body and at least one of the wheels is measured and a corresponding signal indicating the height of the vehicle is produced. This height signal is compared against preset reference signals and the characteristic of the suspension is altered, e.g., the suspension is made harder or softer, in dependance on the comparison. Additionally, the preset reference signals themselves are changed depending upon the alteration in the characteristic of the suspension. Changing the reference signals eliminates influence of the change in the amplitude of vibration of the height of the vehicle as a result of altering of the suspension characterisitc, whereby exact detection of a change in the amplitude of the vibration due to irregularities of the road surface is enabled to prevent overcontrol and hunting.

19 Claims, 12 Drawing Figures

SUSPENSION CONTROLLER

BACKGROUND OF THE INVENTION

1. Field of the Invention

The present invention relates to a suspension controller for a vehicle, particularly to a suspension controller for restraining the vibration of the body of an automobile due to the irregularity of road surface during movement of the automobile.

2. Prior Art

The suspension of a vehicle is controlled depending on the condition of the surface of the road or the moving condition of the vehicle to alter the characteristic of the suspension as occasion demands, not only to improve the feel of the ride of the vehicle but also to assure good operating properties and good stability. For example, altering the constant of the air spring of a suspension depending on the condition of the road surface, altering both the constant of an air spring and the damping force of a shock absorber, and increasing the damping force of a shock absorber at a prescribed vehicle height were proposed in Japan published unexamined patent application Nos. Sho-59-26638, Sho-59-23712, and Sho-58-30542, respectively. In addition, altering the height of a vehicle was proposed in Japan published unexamined patent Nos. Sho-57-172808 and Sho-59-23713. In the above-mentioned control, the spring constant of the suspension, the damping force and the vehicle height are regulated when the rise or fall of the front part of the vehicle is detected by a braking sensor and an acceleration sensor, to improve the feel of the ride of the vehicle.

However, in the conventional control, if the characteristic of the suspension is altered because a vehicle height sensor has judged that the amplitude of the vibration of the vehicle height is larger than a prescribed value, the amplitude is changed due to the alteration of the characteristic of the suspension even though the movement of the vehicle on the road surface remains unchanged. For that reason, there is a problem that the condition of the road surface is mistakenly judged to have changed after the control, though the vehicle is moving on a road surface which is basically unchanged. In addition, if the characteristic of the suspension is altered to increase the height of the vehicle, the center of gravity of the vehicle is raised, the rolling sway of the vehicle is increased, and the amplitude of the vibration of the height of the vehicle is made larger than that when the vehicle height is lower. For that reason, there is another problem that the characteristic of the suspension is overcontrolled even if the protrusion and sinking of the road surface has actually become smaller. Furthermore, when the suspension is controlled to increase its spring constant or damping force, the amplitude of the vehicle height vibration is made smaller than before application of the control, to cause a problem of hunting in which, though the road surface condition has not changed, the characteristic of the suspension is returned to the original state and then altered again.

SUMMARY OF THE INVENTION

Accordingly, one object of this invention is to provide a novel suspension controller, which correspondingly alters a reference signal for judging the amplitude of vehicle height vibration when altering the characteristic of a suspension, eliminates the influence of vehicle body vibration amplitude change due to the alteration of the suspension characteristic, and detects accurately the vibration amplitude change due to the protrusion and sinking in the road surface, so that overcontrol and hunting are prevented.

This and other objects are achieved according to the invention as shown in FIG. 1, which is a schematic view indicating the basic idea of the present invention. The suspension controller is used for the vehicle having the suspension (c) between the vehicle body (a) and a wheel (b), and includes a vehicle height detection means (d) by which the distance between the vehicle body (a) and the wheel (b) is measured to generate a signal (VH(S)n) indicating the height of the vehicle; a judgment means (e) by which the amplitude of the vehicle height signal (VH(S)n) is compared with the levels of preset reference signals (VHh1, VHh2, VHl1 and VHl2) to generate a judgment result signal; a suspension characteristic control means (f) by which control is performed to alter the characteristic of the suspension depending on the judgment result signal; and a reference signal change means (g) by which the reference signals (VHh1, VHh2, VHl1 and VHl2) for the judgment means (e) are changed depending on the alteration of the characteristic of the suspension, as shown in FIG. 1. The distance between the vehicle body and the wheel is detected by the vehicle height detection means (d) as the height of the vehicle. The displacement of the vehicle from the immediately preceeding average vehicle height, or the amplitude vibration of the vehicle height is determined on the basis of the detected distance. The amplitude of the vehicle height vibration is determined by the judgment means (e). A prescribed value, on the basis of which the wheel suspension characteristic is to be maintained or altered, is determined and compared with the amplitude of the vehicle height vibration, by the judgment means (e), to provide the result of the comparison. The suspension characteristic includes the spring constant of the suspension, the damping force of a shock absorber and the height of the vehicle, in the main. The spring constant, damping force and vehicle height are changed by the suspension characteristic control means (f) when the result of the judgment by the judgment means (e) is that the amplitude of the vehicle height vibration is larger than the prescribed value, to alter the wheel suspension characteristic to decrease the vehicle height vibration amplitude. The reference signals for the judgment means (e) are changed by the reference signal change means (g) to decrease the prescribed value, when the suspension characteristic is altered to reduce the vehicle height vibration amplitude.

The action of the suspension controller is hereinafter described referring to FIG. 2 which is a timing chart indicating the output of a vehicle height sensor, and the alteration of the suspension characteristic and the reference signals for the vehicle height vibration amplitude with the lapse of time.

When the vehicle is moving on a road surface having continuous protrusions and sinkings, the vibration of the vehicle height signal VH(S)n is detected by the vehicle height detection means (d), as shown in FIG. 2. At that time, the suspension characteristic is 'soft', namely, the spring constant and the damping force are low. The reference signals generated by the judgment means (e) as upper and lower limits for the vehicle height vibration amplitude are denoted by VHh1 and VHl1, respectively. When the vehicle height vibration amplitude has intersected one or both of the upper and lower limit reference signals VHh1 and VHl1 a number of times, as shown in FIG. 2, it is judged by the judgment means (e) that the amplitude is larger that the reference signal, and an instruction is applied by the judgment means (e) to the wheel suspension characteristic control means (f) to decrease the height vibration amplitude such that the suspension characteristic is changed to 'hard', namely, to heighten the spring constant and the damping force. FIG. 2 shows the time point t1 of this alteration.

In the prior art, though the suspension characteristic is altered, the reference signals for the vehicle height vibration amplitude are not changed depending on the alteration but are kept at the same levels VHh1 and VHl1. The amplitude in the prior art is shown by a dotted line in FIG. 2. In the prior art, the suspension characteristic is altered to 'hard' at the time point t1, so that the vehicle height vibration amplitude is decreased and therefore does not intersect the reference signals VHh1 and VHl1. For that reason, it is mistakenly judged by a judgment means that the condition of protrusion and sinking of the road surface has changed, so that the suspension characteristic is changed back to 'soft' at a time point t2. However, since the suspension characteristic is returned to the original state, the vehicle height vibration amplitude intersects the reference signals VHh1 and VHl1 again, so that the suspension characteristic is realtered to 'hard' again. This results in hunting.

According to the present invention, the reference signals as the upper and the lower limits are changed to levels VHh2 and VHl2, respectively, when the suspension characteristic is altered to 'hard' at the time point t1. Since the suspension characteristic is altered to 'hard', the amplitude of the vehicle height vibration is decreased, as shown by the full line in FIG. 2, though the vehicle is moving on the road surface having the same condition. However, because the reference signals for the amplitude are also changed as mentioned above, the amplitude still intersects the reference signals though the amplitude is decreased. For that reason, overcontrol and hunting are prevented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
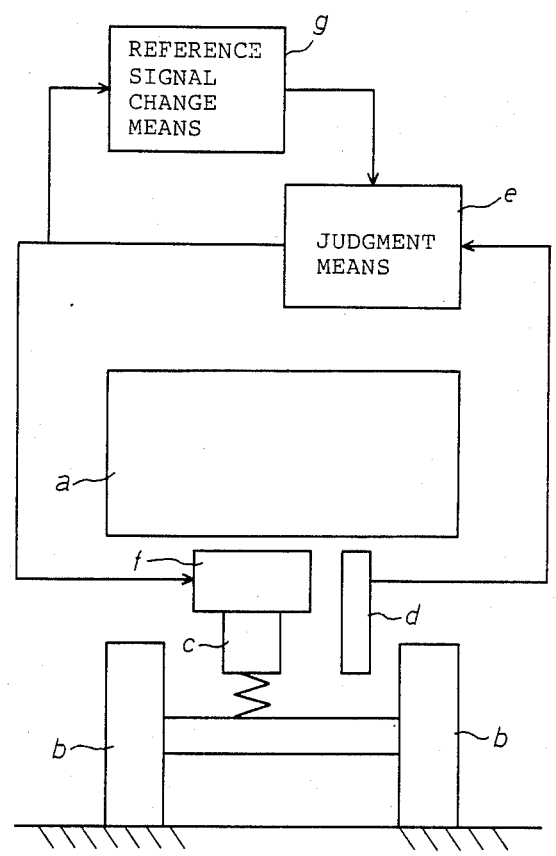
FIG. 1 is a schematic block diagram showing the basic idea of the present invention.
Figure 2:
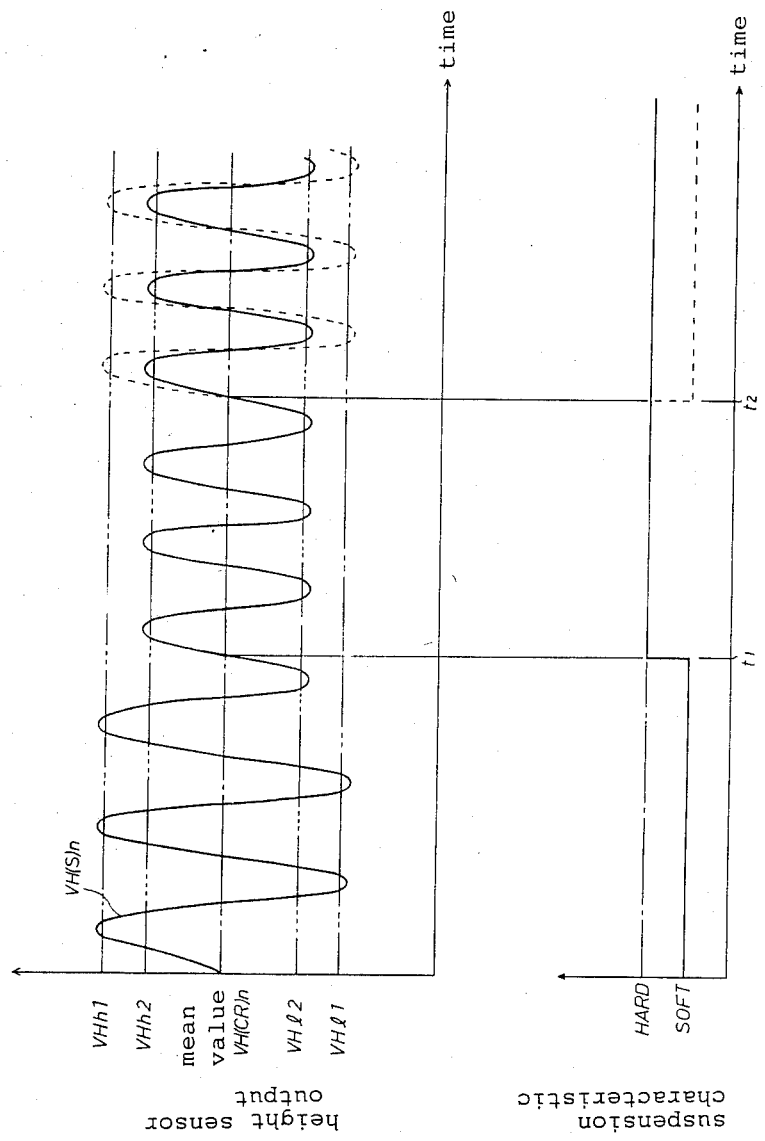
FIG. 2 is an explanatory timing diagram showing the effect of the present invention.

Shown in the drawings are vehicle body (a), wheel (b), suspension (c), vehicle height detection means (d), judgment means (e), suspension characteristic alteration means (f), prescribed value change means (g), vehicle height sensor output Hout., suspension characteristic Schar., time (T), upper and lower vehicle height vibration amplitude limit reference signals VHh1 and VHl1 for 'soft' suspension characteristic (low damping force), upper and lower vehicle height vibration amplitude limit reference signals VHh2 and VH 2 for 'hard' suspension characteristic (high damping force), current vehicle height VH(S)n, average vehicle height VH(CR)n, electronic control unit (ECU) 4, compressed air feed and discharge system 10, vehicle speed sensor SE1, rear-wheel vehicle height sensor H2C, right-front-wheel vehicle height sensor H1R, left-front-wheel vehicle height sensor H1L, right front wheel air suspension S1R, left front wheel air suspension S1L, right rear wheel air suspension S2R, left rear wheel air suspension S2L, main air chamber S2Rs, auxiliary air chamber S2Rb, shock absorber S2Rc, actuator A2R for right rear wheel suspension control rod, control rod 20 for regulation of damping force, openings 24 and 34, passage 42, valve unit 44, valve casing 44a, rotary valve 44b for connecting and disconnecting main and auxiliary air chambers, communication passage 68, large diameter air passage 70, small-diameter air passage 74, annular air passage recess 76, openings 78, 82 and 84, through hole 80, central processing unit (CPU) 4a, read-only memory (ROM) 4b, random access memory (RAM) 4c, backup random-access memory (RAM) 4b, input section 4e, output section 4f, clock circuit 4f, bus 4g, actuator A1L for left front wheel suspension control rod, actuator A1R for right front wheel suspension control rod, actuator A2L for left rear wheel suspension control rod, solenoid V1L for left front wheel air spring feed and discharge valve, solenoid V1R for right front wheel air spring feed and discharge valve, solenoid V2L for left rear wheel air spring feed and discharge valve, solenoid V2R for right rear wheel air spring feed and discharge valve, motor 10a of compressed air feed and discharge system, solenoid 10f for discharge valve, CR filter circuit 4e1, A/D converter 4e2, current vehicle speed V, vehicle speed VO for vehicle movement judgment, minimum unit time tO, constacts CO, h1, h2, l1 and l2, reference constant C2 for the number of times when vehicle height has been higher than prescribed value, flag F1 indicating the state of damping force of suspension, cumulative counter C, and processing steps: 'First time?' 100, 'Initializing' 102, 'Vehicle speed (V) detection' 106, 'Current vehicle height (VH(S)n) detection' 118, 'Average vehicle height (VH(CR)n) detection' 120, 'Vehicle height reference value setting' 122, 'Suspension damping force is changed to be low (SOFT).' 134, and 'Suspension damping force is changed to be high (HARD).' 146.

DESCRIPTION OF THE PREFERRED EMBODIMENTS

Figure 3:
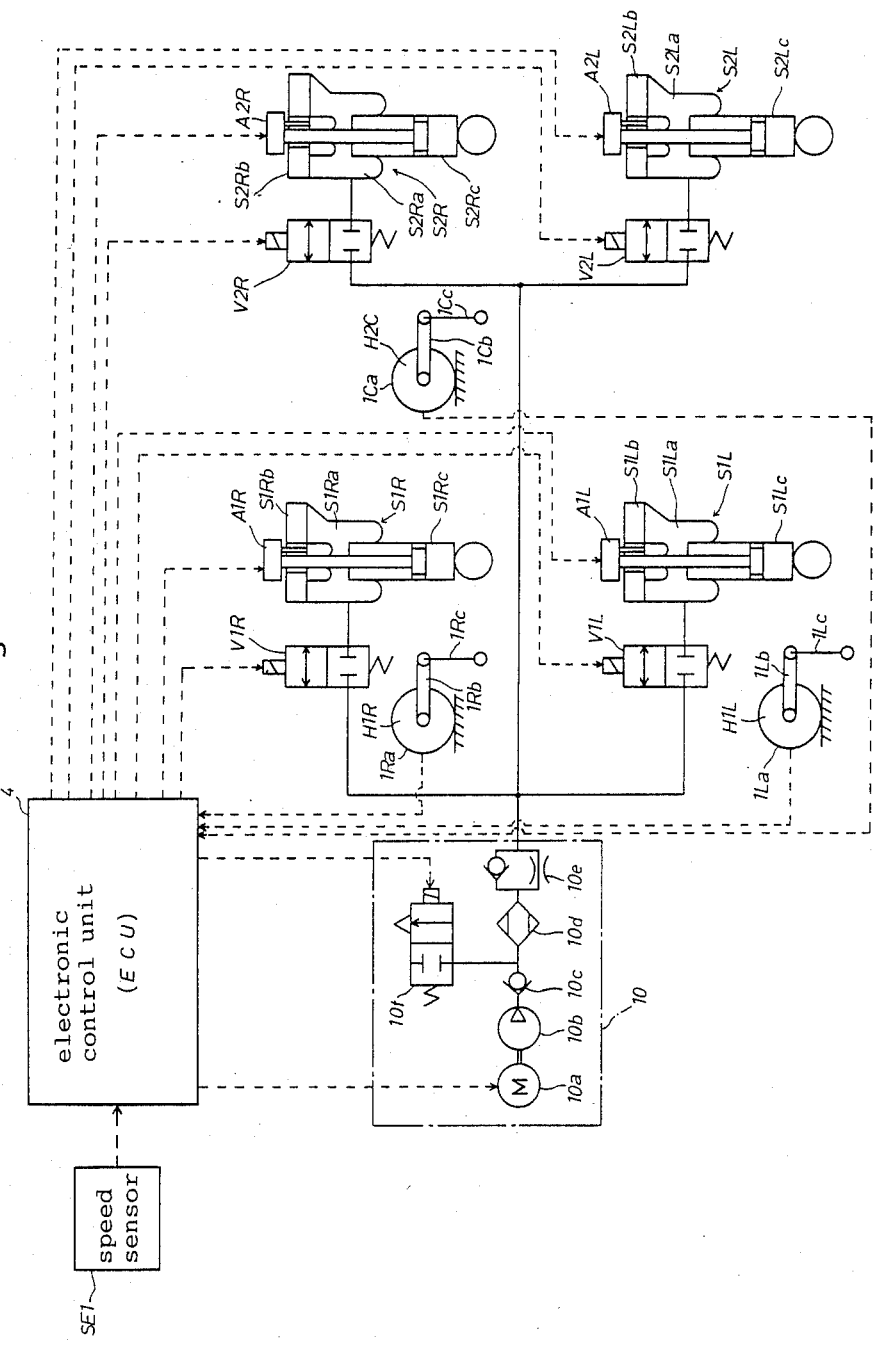
FIG. 3 is a schematic system diagram showing an embodiment of the present invention.

Referring now to the drawings, wherein like reference numerals designate identical or corresponding parts throughout the several views, FIG. 3 shows a preferred embodiment of an automobile air suspension controller according to the invention. A right-front-wheel vehicle height sensor H1R is provided between the body and right front wheel of an automobile to detect the distance between the body of the automobile and its right suspension arm, which follows the motion of the wheel. A left-front-wheel vehicle height sensor H1L is provided between the body of the automobile and its left front wheel to detect the distance between the body of the automobile and its left rear wheel suspension arm. A rear-wheel vehicle height sensor H2C is provided between the body of the automobile and its rear axle to detect the distance between the body of the automobile and its suspension arm for a rear wheel. The short cylindrical bodies 1Ra, 1La and 1Ca of the vehicle height sensors H1R, H1L and H2C are secured on the body of the automobile. Links 1Rb, 1Lb and 1Cb extend from the center shafts of the sensor bodies H1R, H1L and H2C almost perpendicular to the center shafts. Turnbuckles 1Rc, 1Lc and 1Cc are rotatably coupled to the ends of the links 1Rb, 1Lb and 1Cb opposite the sensor bodies. The ends of the turnbuckles opposite the links are rotatably coupled to portions of the suspension arms. Potentiometers are built in the bodies of the vehicle height sensors H1R, H1L and H2C so that the electric resistance of each potentiometer varies depending on the rotation of the center shaft of the body of the sensor to take out the change in the vehicle height in the form of a voltage change. Although the vehicle height sensors H1R, H1L and H2C are constructed as mentioned above, in this embodiment, plural light interrupters may be provided in the body of a sensor so that disks having slits coaxial with the center shaft of the sensor turn on or off light interrupters depending on the change of the vehicle height, thereby to detect the vehicle height.

An air suspension (air spring suspension) S2R is provided in parallel with a suspension spring (not shown), between the body of the automobile and a right rear wheel's suspension arm (not shown). The air suspension S2R primarily includes a shock absorber S2Rc, a main air chamber S2Ra, an auxiliary air chamber S2Rb and an actuator A2R, and has an air spring function, a vehicle height control function and a shock-absorbing function. Similar air suspensions S1R, S1L and S2L are provided for the right front wheel, left front wheel and left rear wheel of the automobile, respectively.

Figure 4:
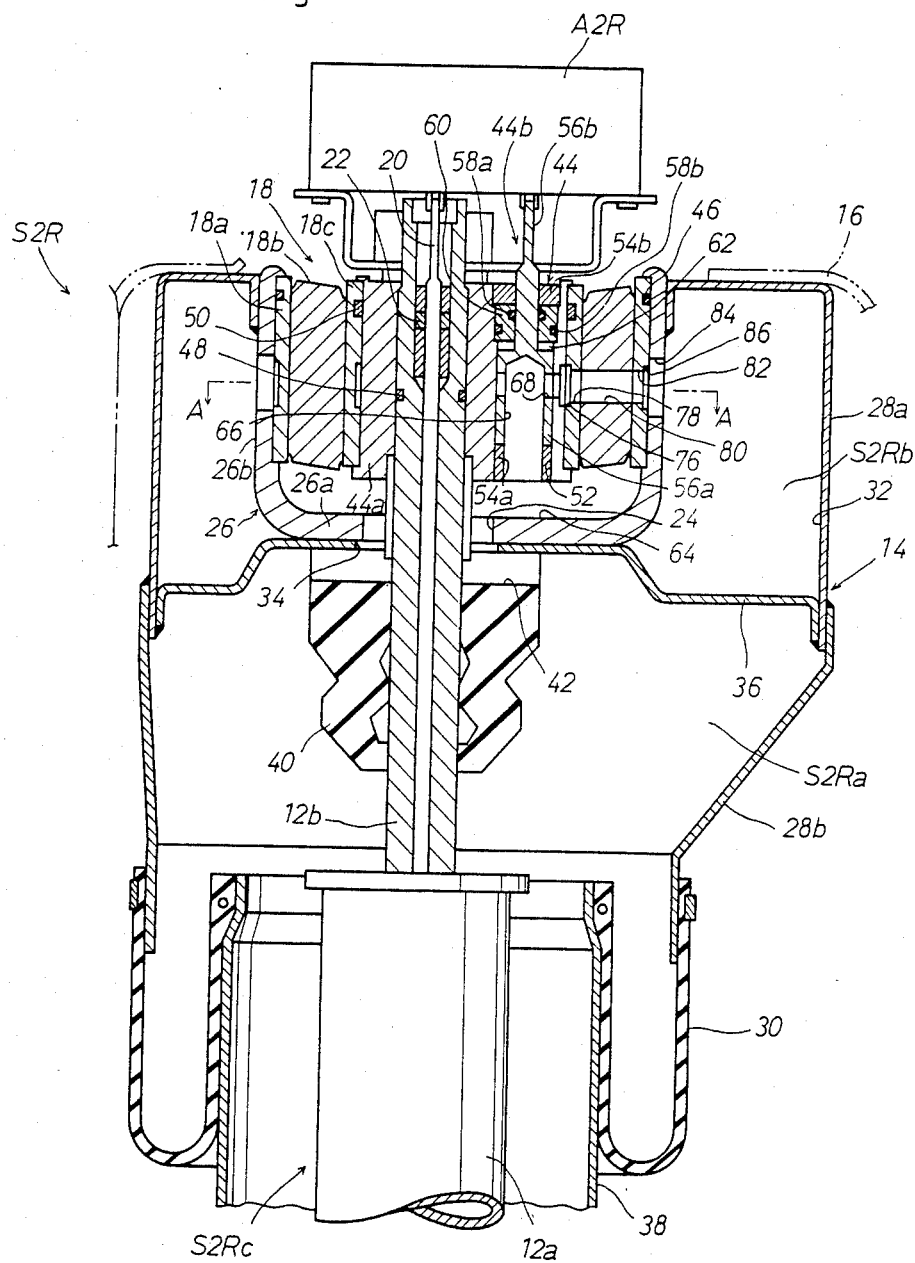
FIG. 4 is a cross-sectional view of the main part of an air suspension to which the present invention is applied.

FIG. 4 shows the construction of the main part of the air suspension S1R, S1L and S2L S2R. The other air suspensions have the same construction as the air suspension S2R. The air suspension S2R includes a conventional shock absorber S2Rc consisting of a piston and a cylinder, and an air spring unit 14 provided in conjunction with the shock absorber, as shown in FIG. 4. An axle (not shown) is supported at the lower end of the cylinder 12a of the shock absorber S2Rc. A cylindrical elastic assembly 18 for elastically supporting a piston rod 12b to the automobile body 16 is provided at the upper end of the piston rod extending from the piston slidably fitted in the cylinder 12a and not shown in the drawings. The damping force of the conventional shock absorber S2Rc can be varied for adjustment, by operating the valve function of the piston of the shock absorber. A control rod 20 for varying the damping force is liquid tightly and rotatably fitted with a sealing member 22 in the piston rod 12b.

The air spring unit 14 has a chamber 32 which is defined by a circumferential member 26 including a bottom 26a having an opening 24, through which the piston rod 12b is allowed to extend, and a wall 26b rising from the peripheral portion of the bottom 26a, an upper housing member 28a covering the circumferential member 26 and secured on the body of the automobile, a lower housing member 28b coupled to the lower end of the upper housing member 28a and open at the lower end, and a diaphragm 30 made of an elastic material and closing the lower end of the lower housing member 28b. The chamber 32 is provided with an opening 34 corresponding to the opening 24 provided in the bottom 26a of the circumferential member 26. The chamber 32 is divided into a main lower air chamber S2Ra and an auxiliary upper air chamber S2Rb by a partition member 36 secured on the bottom 26a of the member 26. Both the chambers S2Ra and S2Rb are filled with compressed air. The partition member 36 is provided with a conventional buffer rubber 40 which can be brought into contact with the upper end of the cylinder 12a. The buffer rubber 40 has a passage 42 for connecting the openings 24 and 34 to the main air chamber S2Ra.

The cylindrical elastic assembly 18 is disposed inside the circumferential member 26 whose wall 26b defines the inside circumferential portion of the auxiliary air chamber S2Rb, in such a manner that the assembly 18 surrounds the piston rod 12b. A valve unit 44 for controlling the communication of the air chambers S2Ra and S2Rb is provided in the cylindrical elastic assembly 18. The assembly 18 includes an outer cylinder 18a, a cylindrical elastic member 18b and an inner cylinder 18c which are disposed concentrically with respect to each other. The cylindrical elastic member 18b is press-fitted in the wall 26b of the circumferential member 26 secured to the automobile body through the upper housing member 28a. The valve casing 44a of the valve unit 44, through which the piston rod 12b is allowed to extend, is secured on the inner cylinder 18c of the assembly 18. The piston rod 12b is secured on the valve casing 44a. As a result, the piston rod 12b is elastically supported to the automobile body through the cylindrical elastic assembly 18. An annular air sealing member 46 is gas tightly packed in between the outer cylinder 18a and the wall 26b. An annular air sealing member 46 is gas tightly packed in between the piston rod 12b and the valve casing 44a. An annular air sealing member 50 is gas tightly packed in between the inner cylinder 18c and the valve casing 44a.

The valve casing 44a has a hole 52 open at both ends and extending in parallel with the piston rod 12. A rotary valve 44b is rotatably fitted in the hole 52. The valve 44b includes a main portion 56a, which can be brought into contact with a lower positioning ring 54a provided at the lower end of the hole 52, and a small diameter operating portion 56b projecting from the main portion 56a above the cylindrical elastic assembly 18. An upper positioning ring 54b, which cooperates with the lower positioning ring 54a to prevent the valve 44b from dropping out of the hole 52, is provided at the upper end of the hole. An annular seal holder 60 for retaining an inner air sealing member 58a and an outer air sealing member 58b for sealing up the hole 52 is provided between the upper positioning ring 54b and the main portion 56a of the valve 44b. A friction-reducing member 62, which acts to smooth the rotative motion of the valve 44b when the main portion 56a of the valve is pushed on the seal holder 60 by air pressure, is provided between the seal holder 60 and the main portion of the valve.

A chamber 64, which communicates with the main air chamber S2Ra through the openings 24 and 34 and the passage 42 of the buffer rubber 40, is defined under the cylindrical elastic assembly 18. The main portion 56a of the valve 44b is provided with a recess 66 open to the chamber 64, and is also provided with a communication passage 68 extending through the main portion 56a in a diametral direction across the recess 66.

Figure 5:
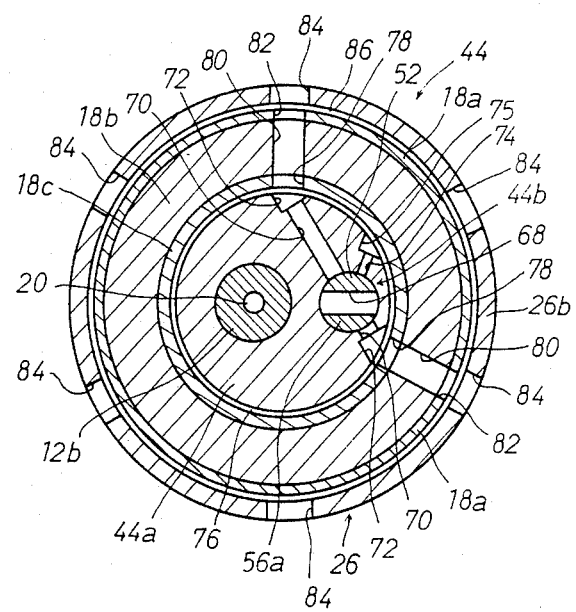
FIG. 5 is a cross-sectional view along the line A-A shown in FIG. 4; .

The valve casing 56b, which houses the main portion 56a of the valve 44b, is provided with a pair of air passages 70, each of which can communicate at one end with the communication passage 68, as shown in FIG. 5. The air passages 70 extend on almost the same plane toward the peripheral surface of the valve 44b, outward in the diametral direction of the hole 52. The other end of each air passage 70 communicates with a face hole 72 open in the peripheral surface of the valve casing 44a. An air passage 74, which can communicate with the communication passage 68, is provided at the hole 52 between the pair of air passages 70 so that the passage 74 extends toward the peripheral surface of the valve casing 44a, on almost the same plane as the air passages 70. The diameter of the air passage 74 is smaller than that of the air passages 70. The other end of the passage 74 communicates with a face hole 75 open in the peripheral surface of the valve casing 44a.

An annular recess 76, which surrounds the peripheral surface of the valve casing 44a to connect the face holes 72 and 75 for the air passages 70 and 74 to each other, is provided on the inside circumferential surface of the inner cylinder 18c covering the peripheral surface of the valve casing 44a. The inner cylinder 18c has openings 78, which extend to the recess 76 that serves as an annular air passage. The cylindrical elastic member 18b has through holes 80 extending outward in the diametral direction of the elastic member correspondingly to the openings 78. Each through hole 80 communicates with the peripheral surface of the outer cylinder 18a through an opening 82 provided therein. As a result, the openings 78 and 82 and the through holes 80 constitute an air passage including the air passages 70 and extending through the cylindrical elastic assembly 18. The outside circumferential surface of the wall 26b of the circumferential member 26 has plural openings 84 located at equal circumferential intervals and extending to the auxiliary air chamber S2Rb to connect the openings 78 and 82 and the through holes 80 to the auxiliary air chamber. An annular recess 86, which surrounds the outer cylinder 18a along the openings 82, is provided on the peripheral surface of the outer cylinder to connect all the openings 84 to the openings 78 and 82 and the through holes 80. The openings 84 extend to the recess 86 which constitutes an annular air passage. Though the openings 78 and 82 and the through holes 80 are provided to correspond to the two air passages 70 of the valve casing 44a, the passages 70 can be provided in desired positions in the circumferential direction of the elastic member 18b because the annular air passage 76, with which the air passages 70 and 74 communicate, is provided between the inner cylinder 18c and the valve casing 44a, as shown in FIG. 5.

The conventional actuator A2R for rotating the valve 44b of the valve unit 44, and the control rod 20 for adjusting the damping force of the shock absorber S2Rc are provided at the upper end of the piston rod 12b, as shown in FIG. 4.

The air suspension S2R has the above-mentioned construction for performing actions hereinafter described. When the valve 44b is in a closed position such that the communication passage of the valve 44b communicates with none of the air passages 70 and 74 of the valve casing 44a, as shown in FIG. 5, the auxiliary air chamber S2Rb and the main air chamber S2Ra are disconnected from each other so that the spring constant of the suspension S2R is set at a large value. When the valve 44b is rotated by the actuator A2R to such a position that the communication passage 68 of the valve communicates with the large-diameter air passages 70 of the valve casing 44a, the main air chamber S2Ra is connected to the auxiliary air chamber S2Rb through the communication passage 68 communicating with the main air chamber, the large-diameter air passages 70 and the openings 78, through holes 80 and openings 82 and 84 of the elastic assembly 18, so that the spring constant of the suspension S2R is set at a small value. When the valve 44b is rotated by the regulated actuator A2R to such a position that the communication passage 68 of the valve communicates with the small-diameter air passage 74 of the valve casing 44a, the main air chamber S2Ra is connected to the auxiliary air chamber S2Rb through the communication passage 68 communicating with the main air chamber, the large-diameter air passages 70 and the openings 78, through holes 80 and openings 82 and 84 of the elastic assembly 18, so that the spring constant of the suspension S2R is set at a small value. When the valve 44b is rotated by the regulated actuator A2R to such a position that the communication passage 68 of the valve 44b communicates with the small-diameter air passage 74 of the valve casing 44a, the main air chamber S2Ra is connected to the auxiliary air chamber S2Rb through the communication passage 68 communicating with the main air chamber, the small-diameter air passage 74, the air passage 76 and the openings 78, through hole 80 and openings 82 and 84 of the elastic assembly 18, so that the spring constant of the suspension S2R is set at an intermediate value because the small-diameter air passage 74 provides a higher air resistance than the large-diameter air passages 70.

A compressed air feed and discharge system 10 for the air springs of air suspensions S1L, S1R, S2L and S2R is provided, as shown in FIG. 3. A compressor 10b is driven by a motor 10a to produce compressed air, which is delivered to an air drier 10d through a check valve 10c which allows the air to flow only in the direction from the compressor to the air drier. The air drier 10d dries the compressed air to be supplied to the air suspensions S1L, S1R, S2L and S2R, to protect air pipes and the parts of the air suspensions from moisture and to prevent any pressure abnormality due to moisture phase change in the main chambers S1La, S1Ra, S2La and S2Ra and auxiliary air chambers S1Lb, S1Rb, S2Lb and S2Rb of the air suspensions. A check valve 10e provided with a fixed orifice allows the air to flow only in the direction from the compressor 10b to the air suspensions S1L, S1R, S2L and S2R. When the compressed air is supplied to the air suspensions, the check valve 10e is opened. When the compressed air is discharged from the air suspensions, the check valve 10e is closed so that the air is discharged only through the fixed orifice. A discharge valve 10f is a spring-offset two-port and two-position solenoid valve. Though the discharge valve 10f is normally in a closed position as shown at the right-hand portion in FIG. 3, the valve is shifted into an open position as shown at the left-hand portion in FIG. 3, at the time of the discharge of the compressed air from the air suspensions S1L, S1R, S2L and S2R, to release the compressed air into the atmosphere through the fixed orifice at the check valve 10e and through the air drier 10d.

Air spring feed and discharge valves V1L, V1R, V2L and V2R for controlling the height of the automobile are provided between the compressed air feed and discharge system 10 and the air suspensions S1L, S1R, S2L and S2R. Each of the air spring feed end discharge valves is a spring-offset two-port and two-position solenoid valve. Though each air spring feed and discharge valve is normally in a closed position as shown in FIG. 3, the valve is shifted to an open position as shown at the upper portion in FIG. 3, then the height of the vehicle is to be adjusted. Then the air spring feed and discharge valves V1L, V1R, V2L and V2R are opened, air can be fed and discharged between the compressed air feed and discharge system 10 and the main air chambers S1La, S1Ra, S2La and S2Ra of the air suspensions. If the air is fed to the main air chambers, their volumes are increased to augment the height of the vehicle. If the air is discharged by the weight of the vehicle, the volumes of the main air chambers are decreased to reduce the height of the automobile. When the air spring feed and discharge valves V1L, V1R, V2L and V2R are closed, the height of the vehicle is kept at the current level. The discharge valve 10f of the compressed air feed and discharge system 10 and the air spring feed and discharge valves V1L, V1R, V2L and V2R can thus be opened or closed to alter the volume of the main air chambers S1La, S1Ra, S2La and S2Ra of the air suspensions S1L, S1R, S2L and S2R to adjust the height of the vehicle.

A vehicle speed sensor SE1 is provided in a speedometer, for example, so that the sensor generates a pulse signal corresponding to the speed of the vehicle, in response to the motion of the axle of the vehicle.

The output signals of the vehicle height sensors H1R, H1L and H2C and the vehicle speed sensor SE1 are entered into the electronic control unit (ECU) 4, which processes the data of the signals to send out drive signals to the actuators A1L, A1R, A2L and A2R of the air suspensions S1L, S1R, S2L and S2R, leveling valves V1L, V1R, V2L and V2R, and the motor 10a and discharge valve 10f of the compressed air feed and discharge system 10.

Figure 6:
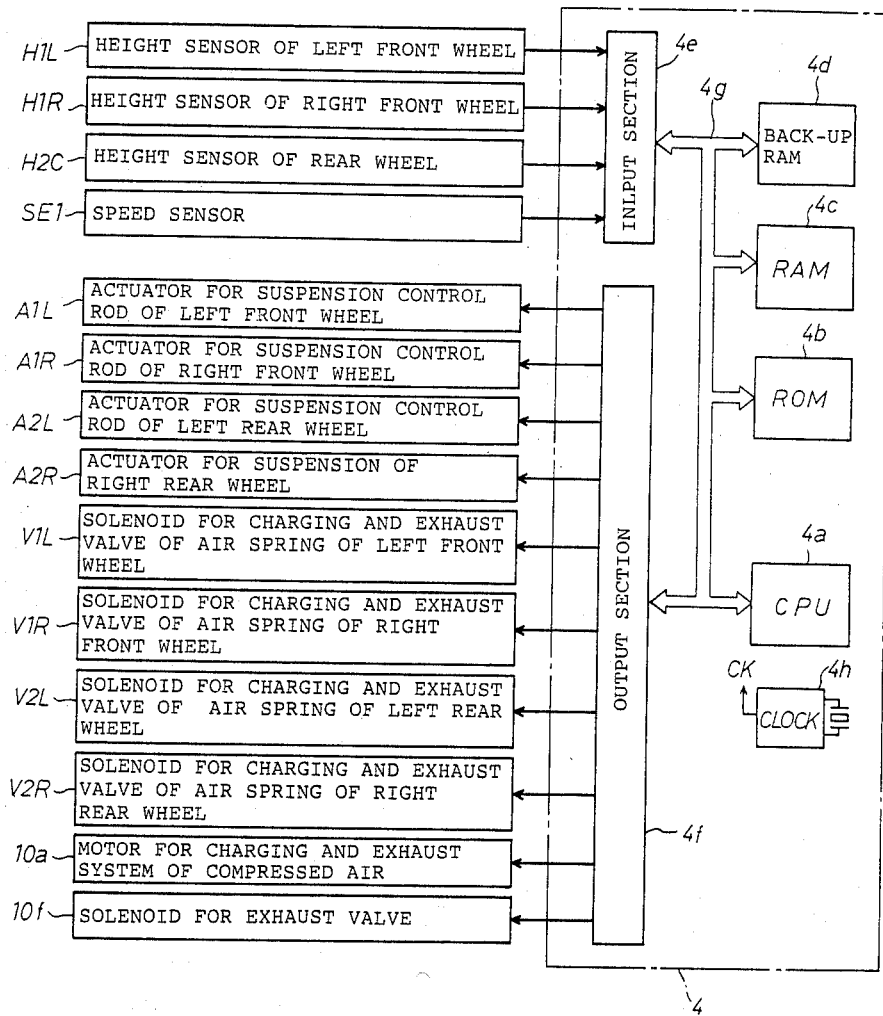
FIG. 6 is a block diagram for explaining operation of the electronic control unit (ECU) shown in FIG. 3.
Figure 7:
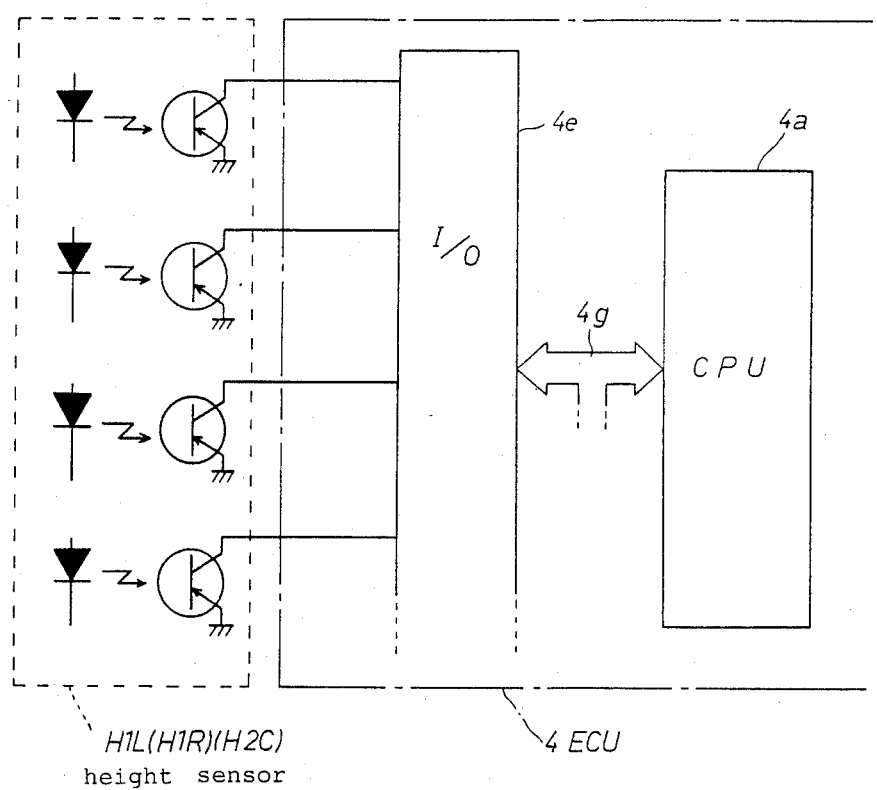
FIG. 7 is a block diagram showing a digital-type vehicle height sensor signal input circuit.

The constitution of the ECU 4 is shown in FIG. 6. A central processing unit (CPU) 4 receives and calculates data sent from the sensors, in accordance with a control program, and performs processing steps for the control of the operation of various units and the like. The control program and initial data are stored in a read-only memory (ROM) 4b. The data, which are entered into the ECU 4, and data, which are necessary for calculation and control, are stored in and read out of a random access memory (RAM) 4c. A backup random-access memory (backup RAM) 4d is backed up by a battery to retain necessary data even if a key switch is turned off. An input section 4e includes an input port (not shown), a shaping circuit provided if necessary, a multiplexer which selectively sends the output signals of the sensors to the CPU 4a, and an A/D converter which changes an analog signal into a digital one. An output section 4f includes an output port (not shown), and a drive circuit for driving the actuators depending on the control signals of the CPU 4a as occasion demands. A bus 4g connects components such as the CPU 4a and the ROM 4b, the input section 4e and the output section 4f to one another to transmit data. A clock circuit 4h supplies the CPU 4a, the ROM 4b, the RAM 4e, etc. with a clock signal for control timing, at prescribed intervals. If the output signals of the vehicle height sensors H1R, H1L and H2C are digital signals, the output signals are transmitted to the CPU 4a through the input section 4e provided with a buffer as shown in FIG. 7.

Figure 8:
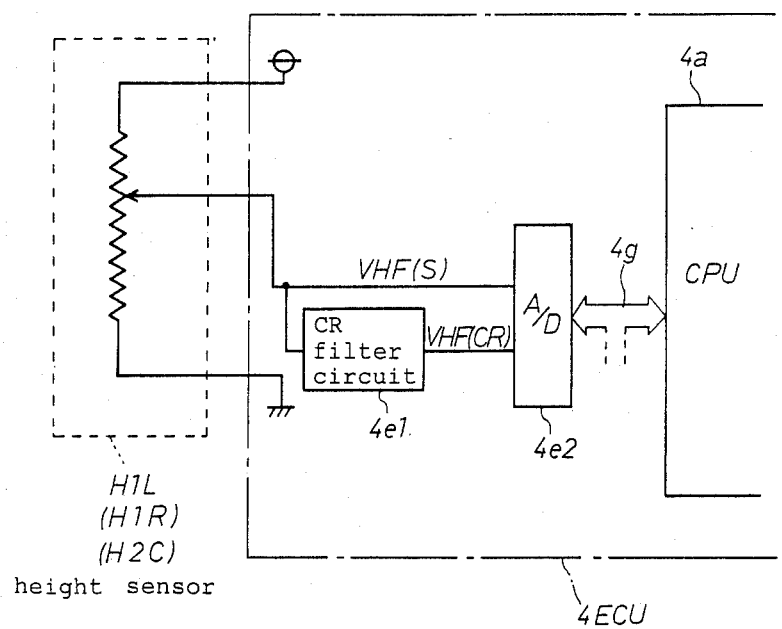
FIG. 8 is a block diagram showing an analog-type vehicle height sensor signal input- circuits.

If the output signals are analog signals, the ECU 4 is provided with a construction as shown in FIG. 8. In that case, the analog signals are analog voltages which indicate vehicle height levels. Each analog voltage signal is changed by a CR filter circuit 4e1, which is a low-pass filter, into a voltage VHF(CR) which indicates the average vehicle height. The voltage VHF(CR) is applied to an A/D converter 4e2. Each analog signal is also applied as the voltage VHF(S) indicating the current vehicle height, directly to the A/D converter 4e2. The converter digitizes both the input signals by the action of a multiplexer, and sends out the digitized signals to the CPU 4a.

Figure 9A:
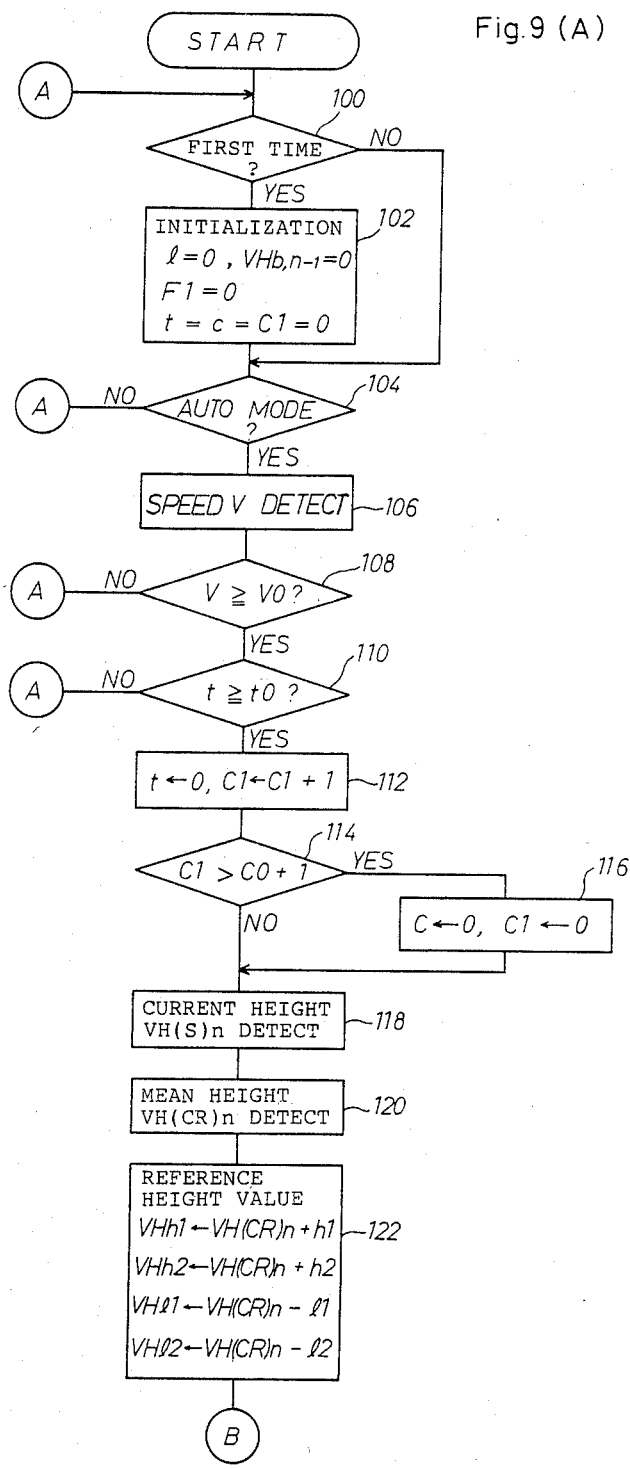
FIGS. 9(A), 9(B) and 9(C) are flow charts showing processing steps which are performed by the ECU.
Figure 9:
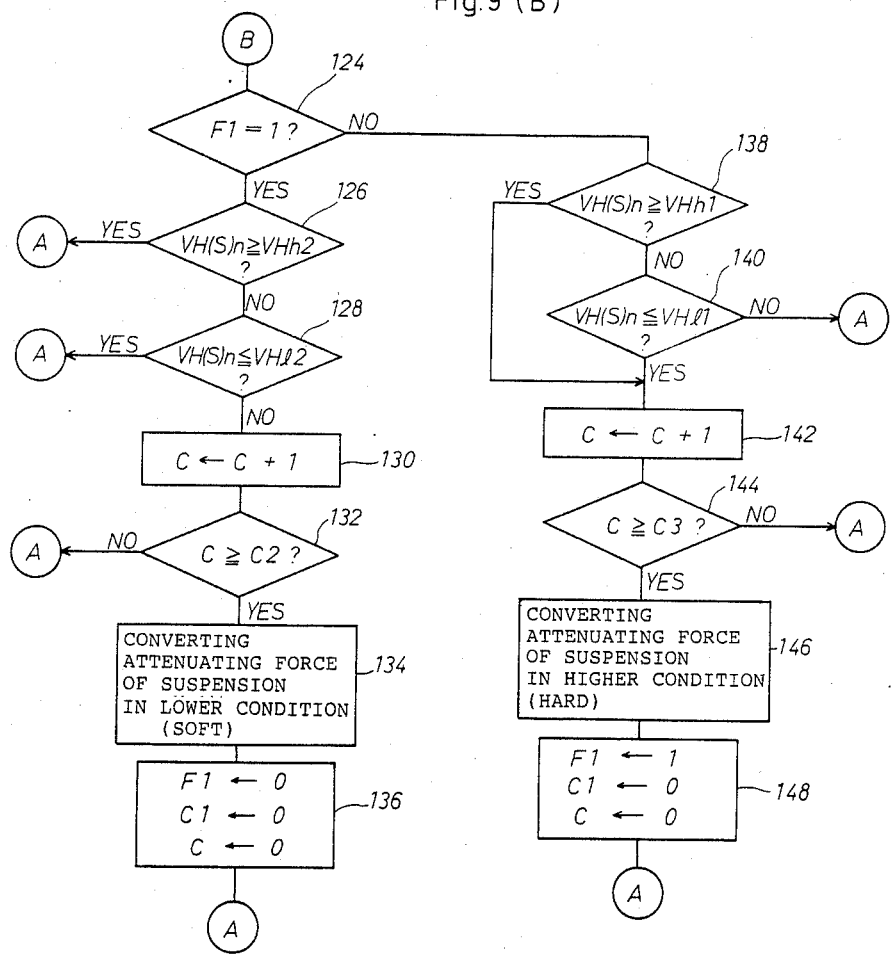
Figure 9:
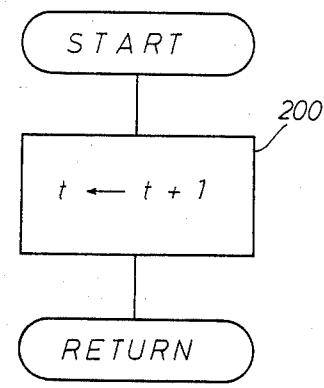

The processing steps, which the ECU 4 performs in response to the linear-type vehicle height sensors which generate the analog signals as shown in FIG. 8, are described referring to flow charts shown in FIGS. 9(A), 9(B) and 9(C). The processing steps are repeated at prescribed time intervals, such as every 5 msec. The processing steps shown in the flow charts are outlined as follows:

(1) the current vehicle height VH(S)n and the average vehicle height VH(CR)n are determined (Steps 118 and 120).

(2) Vehicle height reference signals are set (Step 122).

(3) It is judged whether the damping force of the suspension is high ('hard') or low ('soft') (Step 124).

(4) If the damping force of the suspension is low ('soft'), the amplitude of the vehicle height vibration is compared with upper and lower limit reference signals corresponding to the low damping force, to count the number of the times then the amplitude intersects the signals (Steps 138, 140 and 142).

(5) If the counted number of times exceeds a prescribed value within a prescribed period in Steps (138, 140, 142), the damping force of the suspension is changed to be high ('hard') (Steps 144 and 146).

(6) If the damping force of the suspension is high ('hard') in step 124 the amplitude of the vehicle height vibration is compared with an upper and a lower limit reference signals corresponding to the high damping force ('hard'), to count the number of the times then the amplitude exists between the signsls (Steps 126, 128 and 130).

(7) If the then counted number of times exceeds a prescribed value within a prescribed period in Steps (126, 128, 130), the damping force of the suspension is changed to be low ('soft') (Steps 132 and 134).

Described in (1) to (7) are the main processing steps for producing the effect of the present invention through this embodiment. Other processing steps are hereinafter described in detail. The processing steps are repeated every prescribed time interval, such as every 5 msec. It is first judged (Step 100) whether the procesing steps are being performed for the first time since the activation of the ECU 4. If the processing steps are judged to be being performed for the first time since the activation of the ECU 4, initializing is effected (Step 102) to clear the memories and reset a flag and a timer. After the initializing is effected or if the processing steps are judged to be being performed for the second time or thereafter, Step 104 is taken. In Step 104, it is judged whether or not the movement mode of the automobile is an automatic mode (AUTO mode) set by the driver of the automobile with a manual switch. Only when the movement mode is judged to be the automatic mode, the current vehicle speed V is detected (Step 106). The current vehicle speed V detected in Step 106 is compared with a movement judging speed V0 (Step 108), to perform a control operation mentioned below, only when the vehicle is judged to be moving. Step 110 is then taken to compare a minimum unit time t0 with the output of the minimum unit time measuring timer (t), which has been caused to reach a full count in Step 200 for a prescribed time interval interruption routine shown in FIG. 9(C). For that reason, Step 112 is taken if the time t0 has elapsed. In Step 112, the timer (t) is reset and a prescribed time counter C1 is caused to reach a full count. Step 114 is thereafter taken to judge whether or not the count of the C1 is larger than the sum of a constant C0 and 1, in other words, to judge whether or not the product (t0×C0) of the minimum unit time t0 and the constant C0 has elapsed. If the product is judged to have elasped, a cumulative counter C and the prescribed time counter C1 are reset (Step 116), and Step 118 is then taken. If the product (t0×C0) is judged not to have elapsed yet, Step 118 is taken without resetting the counters C and C1. In Step 118, the current vehicle height VH(S)n is detected. Either of the output levels of the vehicle height sensor H1R for the right front wheel, or H1L for the left front wheel or H2C for the middle between the rear wheels, or the average of the output levels of the sensors for the right and left front wheels, or the largest of these three output levels may be used as the detected current vehicle height (Step 118). The average VH(CR)n of the past vehicle heights detected in Step 118 is determined to set a reference vehicle height (Step 120). In this embodiment, the reference vehicle height VH(CR)n is determined as the average, directly from the output signal of the vehicle height sensor H1L, H1R or H2C through the action of the CR filter circuit 4e1 made of a low-pass filter as shown in FIG. 8. If the vehicle height sensor H1L, H1R or H2C generates the digital signal, the average vehicle height VH(CR)n may be determined by using the past vehicle heights VH(S)n measured by the ECU 4. For example, processing steps shown in FIG. 10 are adopted instead of that in Step 120 shown in FIG. 9(A), to perform the determination of the average vehicle height VH(CR)n through the use of the past vehicle heights VH(S)n.

Figure 10:
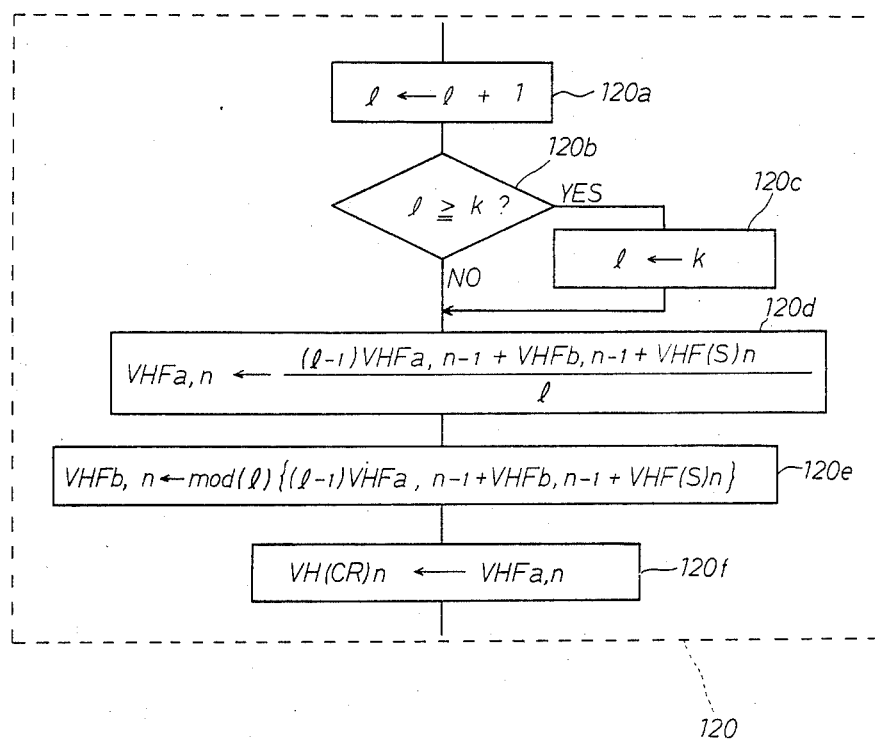
FIG. 10 is a flow chart showing processing steps for calculating an average value.

In the processing steps shown in FIG. 10, a counter (l) is first caused to reach a full count if the current vehicle height VH(S)n is detected (Step 120a), and it is then judged whether or not the content of the counter (l) is larger than an average value calculation reference number (k) (120b). If the content of the counter (l) is judged to be larger than the number (k), Step 120c is taken to replace the content of the counter with the number (k). If the content of the counter (l) is judged to be smaller than the number (k) because the number of the samplings of vehicle height data is small, the content of the counter is used as it is for a following calculation. Step 120d is then taken to perform an operation as follows:

$$VHFa,n \leftarrow \{(l-1)VHFa,n-1 + VHFb,n-1 + VHF(S)n\}/l$$

where:
l: number of averaged measured values;
VHFa,n: Average value to be calculated currently (n-th time);

VHFa,n−1: Average value calculated previously ((n−1)-th time);
VHF(S)n: Measured value of current vehicle height;
VHFb,n−1: Value calculated previously for convenience to determine average value VHFa,n;

In Step 120e, the value VHFb,n is calculated in an operation as follows:

$$VHFb,n \leftarrow mod(l)\{(l-1)VHFa,n-1 + VHFb,n-1 + VHF(S)n\}$$

In the above-mentioned operation, mod(A){B} means the value of the remainder in the division of B by A. In Step 120f, the value VHFa,n is substituted for the reference vehicle height VH(CR)n used as the average value. The processing Steps 120a to 120f are such a simple means for determining the average value, that a value approximate to the average value can be calculated if the values VHFa,n, VHFa,n−1 and VHFb,n−1 are only stored in the memories. Since the past (l−1) pieces of data do not need to be stored with regard to simple means, memories and calculation time are saved. If there are enough memories and calculation time, the average of a required number of measured values may be calculated.

After the average vehicle height VH(CR)n is detected, Step 122 is performed as shown in FIG. 9(A), to calculate reference values for the amplitude of the vibration of the height of the vehicle as follows:

$$VHh1 \leftarrow VH(CR)n + h1$$

$$VHh2 \leftarrow VH(CR)n + h2$$

$$VHl1 \leftarrow VH(CR)n - l1$$

$$VHl2 \leftarrow VH(CR)n - l2$$

VHh1, VHh2, VHl1 and VHl2 2 denote the value for the vehicle height vibration amplitude under the low ('soft') damping force, the upper limit value for the vehicle height vibration amplitude under the high ('hard') damping force, the lower limit value for the vehicle height vibration amplitude under the low ('soft') damping force, and the lower limit value for the vehicle height vibration amplitude under the high ('hard') damping force, respectively, and h1, h2, l1 and l2 denote constants, respectively. When the damping force is low ('soft'), the reference range for the vehicle height vibration amplitude is set wide (from VHh1 to VHl1). When the damping force is high ('hard'), the reference range for the amplitude is set narrow (from VHh2 to VHl2).

The state of a flag F1 indicating the condition of the damping force of the suspension is judged, as shown in FIG. 9(B). In this case Step 138 is immediately taken because of F1=0, to judge whether or not the current vehicle height VH(S)n exceeds the upper limit value VHh1 for the low ('soft') damping force. If the current vehicle height VH(S)n is judged to have exceeded the upper limit value VHh1, Step 142 is taken. If the current vehicle height VH(S)n is judged not to have exceeded the upper limit value VHh1, Step 140 is taken to judge whether or not the current vehicle height VH(S)n has become smaller than the lower limit value VHl1 for the low ('soft') damping force. If the current vehicle height VH(S)n is judged to have become smaller than the lower limit value VHl1, Step 142 is taken. If the current vehicle height is judged not to have become smaller than the lower limit value VHl1, returning to a point A shown in FIG. 9(A) is performed. In Step 142, the cumulative counter C is caused to reach a full count. In Steps 138, 140 and 142, the cumulative counter C cumulatively counts the number of the times when the current vehicle height VH(S)n traverses the amplitude reference range (from VHh1 to VHl1), for the low damping force. The cumulative counting by the counter C is reset each time interval of t0×C0 (Steps 114 and 116). interval In Step 144, it is judged whether or not the count of the cumulative counter C having cumulatively counted the number of the times then the vehicle height has traversed the amplitude reference range for the low damping force ('soft') is larger than a reference constant C3. If the count is judged to be larger than the constant C3, Step 146 is taken. If the count is judged not to be larger than the constant C3, returning to a point A to recommence step 100 shown in FIG. 9(A) is performed. In Step 146, the damping force of the suspension is changed from the low ('soft') level to the high ('hard') level. At that time, the ECU 4 sends out control signals to supply driving electrical currents to the actuators A1R, A1L, A2R and A2L to rotate the control rods of the shock absorbers S1Rc, S1Lc, S2Rc and S2Lc of the suspensions S1R, S1L, S2R and S2L to reduce the cross-sectional areas of orifices. As a result, the flow resistances of the orifices are increased to change the damping forces of the shock absorbers to the high ('hard') level (Step 146). Thereafter, the flag F1 is set, and the prescribed time counter C1 and the cumulative counter C are reset (Step 148). Returning to the point A shown in FIG. 9(A) is then performed.

Proceeding from points A to Steps 100, 104, 106, 108, 110, 112, 114, 116, 118, 120 and 122 shown in FIG. 9(A) can be performed to advance to Step 124 shown in FIG. 9(B). If F1=1 in this case, Step 126 is performed to judge whether or not the current vehicle height VH(S)n exceeds the upper limit value VHh2 for the vehicle height vibration amplitude under the high ('hard') damping force. If the current vehicle height is judged to exceed the upper limit value VHh2, returning to the point A shown in FIG. 9(A) is performed. If the current vehicle height is judged not to exceed the upper limit value VHh2, Step 128 is taken to judge whether or not the current vehicle height VH(S)n is smaller than the lower limit value VHl2 for the vehicle height vibration amplitude under the high ('hard') damping force. If the current vehicle height is judged to be smaller than the lower limit value VHl2, Step 130 is taken to cause the cumulative counter C to reach a full count. In Steps 126, 128 and 130, the cumulative counter C cumulatively counts the number of the times when the current vehicle height VH(S)n exists within the reference signal range (from VHh2 to VHl2) for the vehicle height vibration amplitude under the high ('hard') damping force. The cumulative counting by the counter C is reset every time interval of T0×C0 and 116).

In Step 132, it is judged whether or not the count of the cumulative counter C, having cumulatively counted the number of the times then the current vehicle height VH(S)n has existed within the reference signal range for the vehicle height vibration amplitude under the high ('hard') damping force during the time t0×C0, exceeds a reference constant C2. If the count is judged to exceed the constant C2, Step 134 is taken. If the count is judged not to exceed the constant C2, returning to a point A shown in FIG. 9(A) is performed. In Step 134, the damping force of the suspension is changed from the high ('hard') level to the low ('soft') level. At that time, the ECU 4 sends out control signals to supply driving electrical currents to the actuators A1R, A1L, A2R and A2L to rotate the control rods of the shock absorbers S1Rc, S1Lc, S2Rc and S2Lc of the suspensions S1R, S1L, S2R and S2L to augment the cross-sectional areas of the orifices. As a result, the flow resistances of the orifices are decreased so that each damping force is changed to the low ('soft') level (Step 134). Thereafter, the flag F1, the prescribed time counter C1 and the cumulative counter C are reset (Step 136). Such routine is repeated thereafter.

In the above-mentioned description, the damping force is changed from the low ('soft') level to the high ('hard') level if it is determined that the number of the times when the current vehicle height VH(S)n traverses the reference signal range (from VHh1 to VHl1) for the vehicle height vibration amplitude under the low damping force ('soft') during the prescribed time interval of t0×C0 exceeds the reference constant C3. The damping force is changed from the high ('hard') level to the low ('soft') level as it is determined that the number of the times when the current vehicle height VH(S)n exists within the reference signal range (from VHh2 to VHl2) for the vehicle height vibration amplitude under the high ('hard') damping force during the prescribed time interval of t0×C0 exceeds the reference constant C2. However, since the control condition for changing the damping force as mentioned above does not necessarily take place in every repetition of the processing steps during the actual movement of the vehicle, the vehicle is likely to continue to move while the damping force remains ('soft') or high ('hard').

The air suspensions S1R, S1L, S2R and S2L, the vehicle height sensors H1R, H1L and H2C, the actuators A1R, A1L, A2R and A2L, the air spring feed and discharge valves V1R, V1L, V2R and V2L, the compressed air feed and discharge system 10 and/or the ECU 4, and the ECU 4 in this embodiment correspond to the suspension C, the vehicle height detection means (d), the suspension characteristic control means (f), and the judgment means (e) and the reference signal change means (g), respectively.

In this embodiment, the reference signal range for the amplitude of the vibration of the height of the automobile is made narrow when the damping force of the suspension is high ('hard'), and the reference signal range is made wide when the damping force is low ('soft'), as described in detail sbove, so that hunting is prevented from occuring due to the control of the damping force of the suspension.

Though only the damping force is altered for control in this embodiment, appropriate reference signals can be otherwise set for the amplitude of the vibration of the vehicle height in a case that the main air chambers S1La, S1Ra, S2La and S2Ra and the auxiliary air chambers S1Lb, S1Rb, S2Lb and S2Rb are connected to or disconnected from each other by the actuators A1L, A1R, A2L and A2R to change such other characteristic of the suspension as the air spring constant to a low ('soft') level or a high ('hard') level, or in the case that the compressed air feed and discharge system 10 and the main air chambers S1La, S1Ra, S2La and S2Ra are connected to or disconnected from each other by the air spring feed and discharge valves V1L, V1R, V2L and V2R to change the vehicle height to a low level or a high level, so that overcontrol and hunting are likewise prevented.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A suspension controller for a vehicle having a suspension between a vehicle body and a wheel, comprising:
    vehicle height detection means for detecting the height of the vehicle and for generating a signal indicating the height of the vehicle;
    judgment means for comparing the amplitude of the vehicle height signal with preset reference signals to generate a judgment result signal;
    a suspension characteristic control means for altering a characteristic of the suspension depending on said judgment result signal; and
    a reference signal change means for changing the reference signals for the judgment means in response to the alteration of the characteristic of the suspension.

2. A suspension controller for a vehicle having front and rear wheels according to claim 1, wherein the vehicle height detection means comprises:
    means for measuring at least one of the distances between the vehicle body and the right front wheel, between the vehicle body and the left front wheel and between the vehicle body and a midpoint between the rear wheels.

3. A suspension controller according to claim 2, wherein said measuring means comprises:
    a suspension are coupled to the wheel and movable in accordance with vertical positioning of the wheel; and
    a potentiometer which is mounted on the vehicle body and is coupled to said suspension arm so that the potentiometer is rotated along with a motion of a suspension arm and the electric resistance of the potentiometer correspondingly changes.

4. A suspension controller according to claim 2, wherein said measuring means comprises:
    a suspension arm coupled to the wheel and movable in accordance with vertical positioning of the wheel;
    a plate which has a slit and is mounted on the vehicle body so that the plate is moved along with the motion of the suspension arm; and
    plural light interrupters which are turned off or on in correspondence with movement of said plate.

5. A suspension controller according to claim 2, wherein said measuring means comprises:
    means for selecting one of the distances between the vehicle body and the right front wheel, between the vehicle body and the left front wheel and between the vehicle body and the midpoint between the rear wheels as the vehicle height signal.

6. A suspension controller according to claim 2, wherein said measuring means comprises:
    means for selecting the largest of the three measured distances between the vehicle body and the right front wheel, between the vehicle body and the left front wheel and between the vehicle body and the midpoint between the rear wheels as the vehicle height signal.

7. A suspension controller according to claim 2, wherein said measuring means comprises:
    means for determining the average of the two measured distances between the vehicle body and the right front wheel and between the vehicle body and the left front wheel for use as the vehicle height signal.

8. A suspension controller according to claim 1, wherein said judgment means comprises:
    means for generating a first judgment result signal when at least one of the maximum or minimum values of the vehicle height signal has exceeded the preset upper reference signals a prescribed number of times during a preset period; and
    means for generating a second judgment result signal when said at least one of the maximum or minimum values have become smaller than the preset lower reference signals a prescribed number of times during a preset period.

9. A suspension controller according to claim 8, wherein said suspension characteristic control means comprises:
    means for controlling the characteristic of the suspension to decrease the amplitude of the vibration of the height of the vehicle when the first judgment result signal is received by the suspension characteristic control means; and
    means for controlling the characteristic of the suspension to increase the amplitude of the vibration of the height of the vehicle when the second judgment result signal is received by the suspension characteristic control means.

10. A suspension controller according to claim 1, wherein said vehicle includes air suspensions characterized by spring constants, and wherein said suspension characteristic control means comprises:
    means for making the spring constants of the air suspensions large or small.

11. A suspension controller according to claim 1, wherein said vehicle includes shock absorbers characterized by damping forces, and wherein said suspension characteristic control means comprises:
    means for making the damping forces of the shock absorbers high or low.

12. A suspension controller according to claim 1, wherein said vehicle includes air suspensions, and wherein the suspension characteristic control means comprises:
    means for increasing or decreasing the height of the vehicle by means of the air suspensions.

13. A suspension controller according to claim 1, wherein said vehicle includes air suspensions characterized by spring constants and shock absorbers characterized by damping forces, and wherein said suspension characteristic control means comprises:
    means for making the spring constants of the air suspensions large or small; and
    means for making the damping forces of the shock absorbers high or low.

14. A suspension controller according to claim 10, wherein the suspension characteristic control means makes the spring constants of the air suspensions large or small to increase or decrease the height of the vehicle.

15. A suspension controller according to claim 13, wherein the suspension characteristic control means makes the damping forces of the shock absorbers high or low and causes the air suspensions to increase or decrease the height of the vehicle.

16. A suspension controller according to claim 13, wherein the suspension characteristic control means makes the spring constants of the air suspensions large or small to increase or decrease the height of the vehicle and makes the damping forces of shock absorbers high or low.

17. A suspension controller according to claim 1, wherein the reference signal change means comprises:
means for changing the reference signal to a higher level when the characteristic of the suspension is altered to decrease the amplitude of the vibration of the height of the vehicle; and
means for changing the reference signal to a lower level when the characteristic of the suspension is altered to increase the amplitude of the vibration of the height of the vehicle.

18. A suspension controller according to claim 1, wherein the reference signal change means comprises:
means for determining whether or not to change the reference signal.

19. A suspension controller according to claim 1, wherein the reference signal change means comprises:
means for determining when the speed of the vehicle is not lower than a present level; and
means for changing the reference signal only when it is determined that the speed of the vehicle is not lower than the preset level.

* * * * *